US009805597B2

(12) United States Patent
Karacan et al.

(10) Patent No.: US 9,805,597 B2
(45) Date of Patent: Oct. 31, 2017

(54) METHOD AND DEVICE FOR COMMUNICATION BETWEEN ROAD USERS AND/OR PEDESTRIANS AND A TRAFFIC INFRASTRUCTURE ON THE BASIS OF AN AD-HOC WIRELESS MOTOR VEHICLE COMMUNICATIONS SYSTEM FOR TRAFFIC CONTROL

(71) Applicant: SIEMENS AKTIENGESELLSCHAFT, München (DE)

(72) Inventors: Ömer Karacan, Vienna (AT); Fritz Kasslatter, Gablitz (AT)

(73) Assignee: Siemens Aktiengesellschaft, München (DE)

( * ) Notice: Subject to any disclaimer, the term of this patent is extended or adjusted under 35 U.S.C. 154(b) by 67 days.

(21) Appl. No.: 14/778,596

(22) PCT Filed: Feb. 26, 2014

(86) PCT No.: PCT/EP2014/053690
§ 371 (c)(1),
(2) Date: Sep. 20, 2015

(87) PCT Pub. No.: WO2014/146874
PCT Pub. Date: Sep. 25, 2014

(65) Prior Publication Data
US 2016/0055745 A1   Feb. 25, 2016

(30) Foreign Application Priority Data

Mar. 21, 2013  (DE) .................. 10 2013 205 057

(51) Int. Cl.
*G06F 19/00* (2011.01)
*G06G 7/70* (2006.01)
(Continued)

(52) U.S. Cl.
CPC ............. *G08G 1/07* (2013.01); *G08G 1/0129* (2013.01); *G08G 1/056* (2013.01); *G08G 1/163* (2013.01);
(Continued)

(58) Field of Classification Search
CPC .... G08G 1/056; G08G 1/0116; G08G 1/0129; G08G 1/0133; G08G 1/07; H04W 4/008; H04W 84/18
(Continued)

(56) References Cited

U.S. PATENT DOCUMENTS

2011/0095908 A1\* 4/2011 Nadeem .................. B60H 3/00
340/905

FOREIGN PATENT DOCUMENTS

EP   2315189 A2   4/2011
EP   2416302 A1   2/2012

OTHER PUBLICATIONS

German Office Action for related German Application No. 10 2013 205 057.7, mailed Nov. 22, 2013, with English Translation.
(Continued)

*Primary Examiner* — Isaac Smith
(74) *Attorney, Agent, or Firm* — Lempia Summerfield Katz LLC

(57) ABSTRACT

The invention relates to a method and a stationary device for communication on the basis of an ad-hoc interacting motor vehicle communication system, particularly of the wireless variety. Communication occurs between the road users and/or pedestrians themselves and/or between road users and/or pedestrians and the traffic infrastructure wherein, in the near field of a traffic route junction, particularly T-junctions or intersections of traffic routes such as road or railway junctions, a radio transmission/receiving device associated with a first road user continuously transmits a message to at least (Continued)

one second radio transmission/receiving device that is associated with a device of the traffic infrastructure and located in the radio coverage range of said first radio transmission/receiving device, the message being transmitted such that a first direction of a change in position of the first road user is detected on the basis of the received message, a history of detected directions is compiled on the basis of these messages, a first correlation is determined between said first direction and the historical directions, a second correlation is determined with the result of said first correlation and a reference traffic lane of pre-plotted traffic lanes at the traffic route junction, said reference traffic lane corresponding to the geographic course and being the basis for road user and/or pedestrian control, particularly when initialising the traffic control, and road users and/or pedestrians being controlled on the basis of said first and/or second correlation.

23 Claims, 4 Drawing Sheets

(51) Int. Cl.
*G06G 7/76* (2006.01)
*G08G 1/07* (2006.01)
*H04W 4/02* (2009.01)
*H04W 4/04* (2009.01)
*G08G 1/16* (2006.01)
*G08G 1/01* (2006.01)
*G08G 1/056* (2006.01)
*H04W 4/00* (2009.01)
*H04W 84/18* (2009.01)

(52) U.S. Cl.
CPC .......... *H04W 4/008* (2013.01); *H04W 4/028* (2013.01); *H04W 4/046* (2013.01); *H04W 84/18* (2013.01)

(58) Field of Classification Search
USPC ........................................... 701/117
See application file for complete search history.

(56) References Cited

OTHER PUBLICATIONS

Intelligent Transport Systems (ITS), Communications Architecture, ETSI DRAFT, DRAFT_EN_302665V01001V, European Telecommunications Standards Institute (ETSI), 650, Route des Lucioles, F-06921 Sphia-Antipolis, No. V1.0.1, pp. 1-43, XP014072772, Jul. 19, 2012.
Nafi N. S. et al: A VANET Based Intelligent Road Traffic Signaling System, Telecommunication Networks and Applications Conference (ATNAC), 2012, Australasian, IEEE, pp. 1-6, ISBN: 978-1-4673-4408-1, DOI: 10.1109/ATNAC.2012.6398066, XP032293687, Nov. 7, 2012.
PCT International Search Report and Written Opinion of the International Searching Authority dated Jul. 14, 2014 for corresponding PCT/EP2014/053690.

* cited by examiner

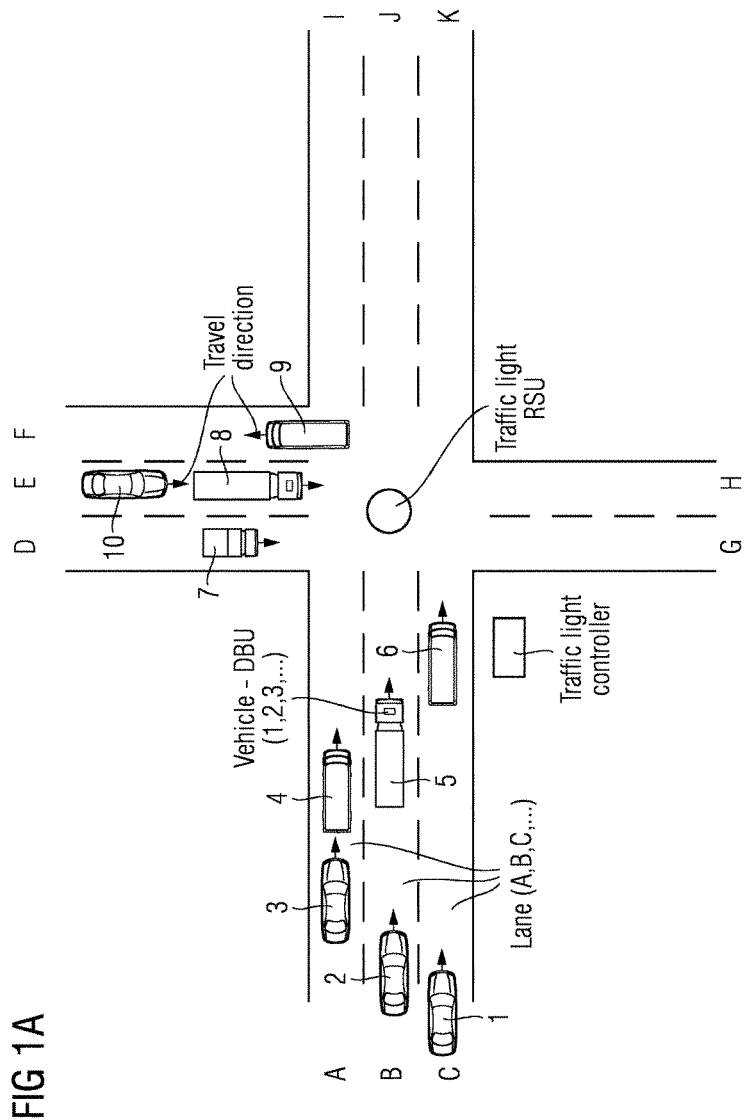

METHOD AND DEVICE FOR COMMUNICATION BETWEEN ROAD USERS AND/OR PEDESTRIANS AND A TRAFFIC INFRASTRUCTURE ON THE BASIS OF AN AD-HOC WIRELESS MOTOR VEHICLE COMMUNICATIONS SYSTEM FOR TRAFFIC CONTROL

This application is the National Stage of International Application No. PCT/EP2014/053690, filed Feb. 26, 2014, which claims the benefit of German Patent Application No. DE 10 2013 205 057.7, filed Mar. 21, 2013. The entire contents of these documents are hereby incorporated herein by reference.

BACKGROUND

The present embodiments relate to operating a static device within a system for communication and to the static device for communication within the system for communication.

It is known that radio transmission/radio reception devices for communication within a motor vehicle communication system interacting in ad-hoc fashion (e.g., wirelessly) are being used for communication among road users. Interacting in ad-hoc fashion may be ad-hoc networks (e.g., essentially self-organizing networks) formed or operated spontaneously by direct communication by the network nodes involved. In road traffic, this communication may include motor vehicles (e.g., "car to car" (C2C) communication). However, this communication also includes communication with the traffic infrastructure. The traffic infrastructure is formed, for example, by base stations formed by "roadside units" (RSU), such as traffic lights, for the purpose of conveying the communication or disseminating information to information networks, or controlling traffic centers, that are connected to the traffic lights. This communication is called "car to infrastructure" (C2I). Since, in principle, motor vehicles are not the only road users, but bicycles or cyclists and pedestrians are also involved, this communication also includes the interchange of data between radio transmission/radio reception devices operated by the bicycles or cyclists and pedestrians and the radio transmission/radio reception devices operated by motor vehicles. There is no term or acronym for these, but these interchanges of data are included in the term "car to X" technology or communication (C2X) that is known for the generalization of this type of communication.

In this context, this type of communication is to be distinguished from the known mobile radio communication, since the this type of communication takes place in automated fashion (e.g., predominantly without triggering or required actions from the user) and serves the purpose of collecting and interchanging traffic-related data, so that all possible traffic situations may be reacted to (e.g., by warnings to the user or automated responses from the motor vehicle).

For the collection of data and the interchange thereof, it is known that each motor vehicle sends out a cyclic message at an interval of a few seconds that contains a vehicle ID and details relating to speed, direction, and position.

It is additionally known that controls are performed for road junctions (e.g., by roadside units (RSUs)). It is known that the sequence and timing of traffic light changes vary based on information that comes from a multiplicity of sensors that are accommodated in the ground beneath the roads, for each prescribed lane. The information that is detected and reported (e.g., on a multilane road) contains the vehicle presence, the vehicle direction and the vehicle speed.

Different sensors are to be provided in this case in order to allow exact determination of the position and direction of vehicles that are traveling in a particular lane.

These sensors are very expensive and are to be frequently serviced in order to afford accurate functionality. By way of example, known arrangements involve the use of motion detectors, presence detectors, video cameras, and other highly developed equipment in order to determine the flow of traffic and to ascertain the presence of vehicles in a particular lane, such as particularly at road junctions.

SUMMARY AND DESCRIPTION

The scope of the present invention is defined solely by the appended claims and is not affected to any degree by the statements within this summary.

The present embodiments may obviate one or more of the drawbacks or limitations in the related art. For example, position finding and determination of vehicle direction in specific lanes within a traffic area, such as a junction, that overcomes the aforementioned problems of a communication system interacting in ad-hoc fashion is provided.

A method for communication on the basis of a motor vehicle communication system (e.g., wireless communication system) interacting in an ad-hoc manner, where the communication takes place among road users and/or between road users and traffic infrastructure, is provided. In the vicinity of a node of traffic routes (e.g., T-junctions or intersections of traffic routes such as road junctions or grade crossings), a radio transmission/radio reception device associated with a first road user continuously sends a message to at least one second radio transmission/radio reception device, associated with a device of the traffic infrastructure, that is in a radio coverage area of the first radio transmission/radio reception device. The message is sent in a manner such that the received message is taken as a basis for ascertaining a first direction of a change of position of the first road user. The messages are taken as a basis for forming a history about ascertained directions. A first correlation between the first direction and the history of directions is ascertained. A second correlation with the result of the first correlation and a reference lane from predetermined lanes at the node of traffic routes is ascertained. The reference lane is taken as a basis for control of the road users and corresponds to the geographical profile (e.g., for initialization of traffic control. The first correlation and/or second correlation is taken as a basis for controlling the road users.

This allows the provision of simple determination of the course of the road for vehicles alternatively for traffic monitoring or control.

If, when at least two road users are present, the history is formed by the traffic infrastructure, at least based on a relative position of the road users in relation to one another, the course of lanes may be ascertained. This also achieves flexible ascertainment of lane changes, for example, as a result of closure owing to roadworks. This makes it possible to avoid incorrect controls by lane information that is stored statically in the system and also stipulated thereby.

In this context, it is advantageous if when at least two road users are present, the history is formed by the traffic infrastructure based on the temporal trend in the position of the first road user within a time window. This affords several advantages such as, for example, that the recorded volume of data to be processed is limited and a constant reference variable exists, which may be useful for further (e.g., statistical) evaluation.

In the known systems, the length of the time window may be stipulated (e.g., as one second). Significant results may also be expected over this time.

In one embodiment, the road users are controlled such that information from signal transmitters (e.g., electronic signs, traffic lights, traffic management systems) is changed based on the correlation. This allows prompt control matched to the situation, since signal transmitters (e.g., those cited) are in direct proximity to traffic nodes. This proximity has a few advantages, such as that the radio transmission/radio reception devices may be used from relatively short range.

This is advantageous when, for example, the message is at least intermittently sent at periodically repeated intervals in the vicinity (e.g., the radio transmission/radio coverage area of the device of the traffic infrastructure), as may be provided in a further development. The periodic sending allows the journey of a vehicle to be tracked without radio channels needing to be continuously occupied, for example. This has a resource-saving effect.

If, as provided according to one development, the length of the period is stipulated (e.g., as 100 milliseconds), the method may be implemented with minimized complexity in current standardized systems.

It may be advantageous if the method is developed by virtue of the message containing a piece of information conveying the direction of travel, position, dimension, type, and/or speed of the first road user (e.g., vehicle), since each of the cited variables may individually or in combination, so as to reinforce one another, increase the accuracy of determination of the course of the road. By way of example, the information about the position in combination with the dimension or type (e.g., vehicle type) allows determination (or at least estimation) of the road boundary lines. The direction of travel and speed may, inter alia, also be used for determining the lane function (e.g., whether a left/right turn lane is involved). These are merely combinations chosen as examples, however.

In one embodiment, the history is formed such that the data received in the time windows are used to ascertain lanes for the vehicles by computer and to correlate the lanes such that the reference lane, from predetermined lanes at the node of traffic routes, that is taken as a basis for controlling the road users and that corresponds to the geographical profile (e.g., for initialization of traffic control) is formed afresh by the correlation maxima and stored. This provides an easy-to-implement and reliable sequence for the determination, since correlation maxima are a strong indication of the course of the lanes. Subsequently storing this allows further refinement at later times. A self-learning system that is capable of automatically determining and hence also adjusting corresponding traffic topology is thus available.

In order to initiate an adjustment, the embodiment in which the reference lane is updated for stipulated events (e.g., timer expiry and/or at least in the event of a discrepancy above a threshold value between a currently ascertained lane and the reference lane) is provided. This allows road closures on account of accidents or temporary alternatively longer-term changes, for example, to be ascertained and the traffic control to be adjusted accordingly.

If the transmitted position is ascertained based on a satellite-assisted navigation system, such as GPS, Galileo, and/or other national and international navigation satellite systems for position finding, consideration is given to the circumstance, inter alia, that such systems enjoy prevalence in traffic anyway. This provides that the present embodiments may be implemented with relatively little complexity. In addition, these systems are also relatively accurate. Alternatives for position finding such as triangulation by base stations are also automatically suitable for implementation of the present embodiments.

The present embodiments may also be developed such that the radio transmission/radio reception devices are operated for data transmission based on a dedicated short-range radio communication standard for, for example, Dedicated Short-Range Communication, "DSRC". Short-range radio standards of this kind are particularly suitable for communication between vehicles and other mobile road users and, by virtue of the standardization, provide that the interaction also works. When integrated with the WLAN standard 802.11, such as 802.11a/b/e/g/n/p and further derivatives thereof, this works very well.

If the radio transmission/radio reception devices according to one or more of the present embodiments are intended to be operated in the USA, it is advantageous if the devices are operated for data transmission based on the Wireless Access in Vehicular Environments, "WAVE", standard (IEEE1609) or derivatives thereof.

In this case, a defined radio interface for the radio transmission/radio reception devices is obtained if the radio transmission/radio reception devices are operated for data transmission at least in part based on ETSI standard Intelligent Transportation Systems, ITS, or derivatives.

Prevalence and/or broad penetration is occasioned in this case by the development in which the radio transmission/radio reception devices are operated for data transmission at least in part based on the standard IEEE802.11 or derivatives (e.g., IEEE 802.11p), since every portable consumer appliance, such as a mobile phone or PDA, now has such a WLAN interface. This provides that these appliances may be used for traffic-related communication among road users without great changes. In this case, the development using the IEEE 802.11p derivative is very reliable for quickly moving objects such as motorized vehicles.

In one embodiment, the radio transmission/radio reception devices or the associated method to perform the communication with road users may at least in part be based on a mobile radio standard, such as GSM, UMTS, LTE or derivatives thereof. This may provide for better penetration and coverage, since pedestrians and cyclists who are in possession of a mobile radio (e.g., mobile phone), as already indicated, may likewise be integrated into the communication as road users. A more comprehensive overall picture of the traffic may thus be formed.

Further penetration is achieved if the radio transmission/radio reception devices are developed such that the devices are operated for communication with road users at least in part based on the European standard ETSI TC ITS, the American "Vehicle Safety Communications Program, VSC", the successor thereto "Connected Vehicle Communications Program" or the Japanese "Advanced Vehicle Safety Program, AVS". This allows the device according to one or more of the present embodiments to be used in different parts of the world.

This is augmented, or there is also the suitable alternative of developing the radio transmission/radio reception devices used in accordance with the method such that the devices are operated for communication with road users at least in part based on the ISO standard "continuous-air long and medium range," CALM. This allows the device to be used not only worldwide but also without changes or national adjustments, which is commensurable with the mobility concept of vehicles.

The static device of a system for communication among road users and/or between mobile road users and static devices of the traffic infrastructure of a "wireless" motor vehicle communication system interacting in an ad-hoc manner has a way (e.g., a device) to determine the geographical position of the second devices at least based on a variable that correlates with communication with the first devices.

The static device according to one or more of the present embodiments allows the method to be implemented and therefore affords full expansion of the advantages cited for the method.

This applies to all developments of the static device that have a way (e.g., a device) for performing the individual developments of the method.

A static device for communication based on a motor vehicle communication system (e.g., wireless) interacting in an ad-hoc manner, where the communication takes place among road users and/or between road users and traffic infrastructure, is provided. In the vicinity of a node of traffic routes (e.g., T-junctions or intersections of traffic routes such as road junctions or grade crossings), a radio transmission/radio reception device associated with a first road user continuously sends a message to at least one second radio transmission/radio reception device, associated with a device of the traffic infrastructure, that is in a radio coverage area of the first radio transmission/radio reception device. The message is sent in a manner such that the received message is taken as a basis for ascertaining a first direction of a change of position of the first road user. The messages are taken as a basis for forming a history about ascertained directions. A first correlation between the first direction and the history of directions is ascertained. A second correlation with the result of the first correlation and a reference lane is ascertained. The reference lane is taken as a basis for control of the road users and corresponds to the geographical profile (e.g., for initialization of traffic control). The first correlation and/or second correlation is/are taken as a basis for controlling the road users.

The static device according to the one or more of the present embodiments implements the method according to the present embodiments and therefore affords full expansion of the advantages cited for the method.

This also applies to all developments of the static device that have a way (e.g., a device) for performing the individual developments of the method.

BRIEF DESCRIPTION OF THE DRAWINGS

FIGS. 1a-d schematically show the situation of road users in a mobile ad-hoc network and also the individual steps of lane ascertainment, which are represented in accordance with an exemplary embodiment.

DETAILED DESCRIPTION

Figure 1B:
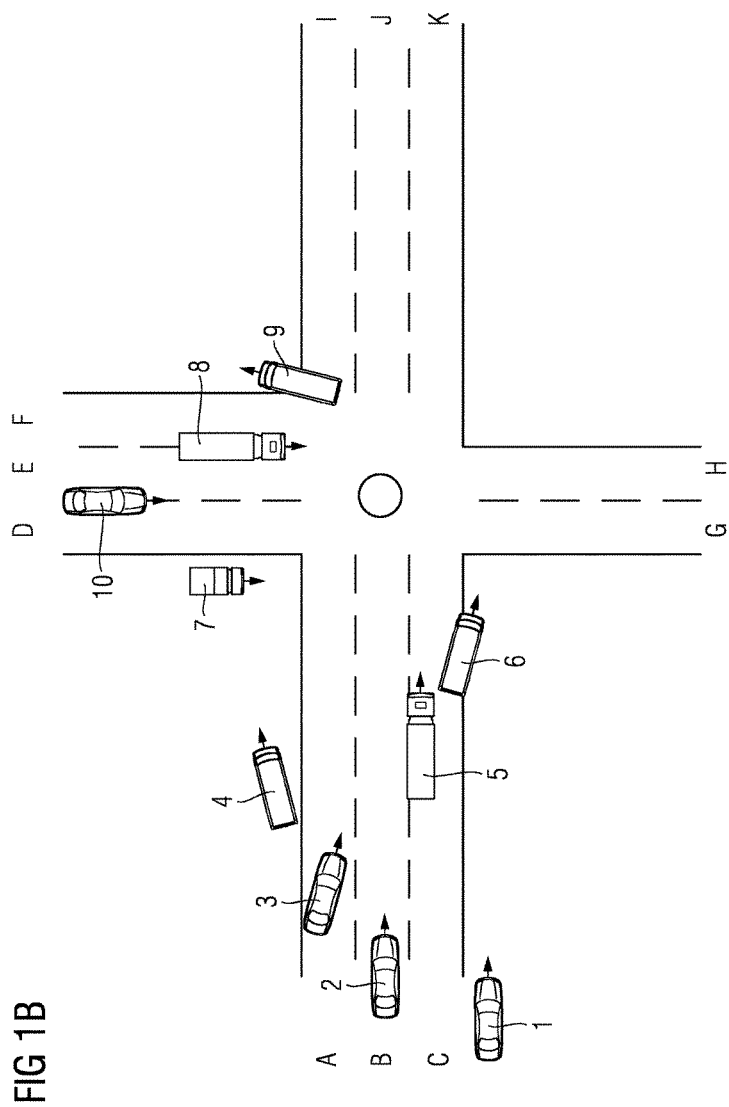

Based on the scenario dealt with in FIG. 1, the individual figure portions 1a . . . 1d show possible refinements and developments of the present embodiments and also advantages thereof.

One or more of the present embodiments improve traffic control systems that are based particularly on satellite-based technology for position finding, such as GPS or Galileo. The reason for this is, for example that such methods are currently very popular in order to allow global position finding. Such methods are therefore also prevalent.

These systems are, however, not suitable for affording the accuracy requirements on which the presented scenario is based. This is because such systems have an error of approximately one to two meters, which may increase to errors of up to 30 meters as a result of environment influences and the like.

One or more of the present embodiments are therefore reliant on moving vehicles (e.g., automobiles, trucks, or trains) continuously sending information (e.g., position, speed, and the direction of travel) via air interface (OBU) that is integrated in the automobile or vehicle. Receiving radio reception/radio transmission devices that are mounted in the roadside unit (RSU) on the infrastructure side (e.g., road junctions or controllers thereof, traffic lights, and train controllers) receive this information and extract the position and the trip or journey information (e.g., position, speed, direction of travel, and vehicle orientation) from these regularly sent messages.

The present embodiments make use of the RSU knowing the exact topology (geometry) of the lanes of the road or the train or track profiles of the relevant surroundings (e.g., width of the lane, radius of lanes, or the permitted direction of travel).

Since, as mentioned above, the satellite-assisted position that is ascertained by the vehicle may differ from the real position by several meters and hence very rarely matches the exact position of the lane that is known to the RSU, according to one or more of the present embodiments, the RSU will only know, when a vehicle is in transit in a particular lane, that the vehicle is situated exactly at that location one or combinations of the following procedures are connected as an exemplary embodiment. Method acts and device(s) allow the relative position of the vehicles in relation to one another or at a particular time may be ascertained. Method acts and device(s) take account of attributes of the vehicles, such as length, width and type of the vehicle. Method acts and device(s) ascertain the direction or orientation of the trip or vehicles at a particular instant. Method acts and device(s) ascertain lanes for the vehicles within a small time window (e.g., a few seconds). Method acts and devices place these computed lanes above one another.

Figure portion 1 shows an initial situation (e.g., a scenario in road traffic) at a road junction that is controlled by a traffic light controller TLC. The traffic light controller TLC may optimize the signal phase for a traffic light RSU and the timing only if the knowledge is available concerning how many vehicles are waiting or are traveling in a particular lane A . . . K (e.g., in a specific direction).

The roadside unit (RSU), which in this scenario is positioned within the traffic light, for example, continuously receives status information from the vehicles (e.g., position, speed, direction of travel, orientation, vehicle type, vehicle dimensions) and is connected to the traffic light controller TLC in this regard for the purpose of controlling the traffic.

Although figure portion 1a shows only vehicles, pedestrians, cyclists, trains, or other road users are not excluded from the present embodiments or the implementation thereof, and data may likewise be captured and evaluated in accordance with the present embodiments based on the present embodiments. By way of example, use of smartphones by pedestrians and/or cyclists allows these to be used for position finding according to the present embodiments too.

As discussed above, the position information that is used by satellite positioning systems such as GPS or Galileo is not accurate enough and, as already mentioned, may have an error of up to 30 meters.

One concept according to the present embodiments involves the assumption that a position error on account of atmospheric conditions is the same for all satellite receivers in the vehicles. In the exemplary embodiment, this error is therefore eliminated by virtue of the vehicle movements being compared.

This is clarified in figure portion 1b, which conveys an example of the detected positions of the vehicles 1 . . . 10 using satellite positioning and direction of travel thereof at a particular instant in a specific area (e.g., a road junction).

As shown in figure portion 1b, the poor accuracy of the satellite positioning systems provides that the vehicles 1 . . . 10 are not geographically congruent with the respective direction or position of the lanes, as stored in the roadside unit RSU. If the relative position of the vehicles 1 . . . 10 in relation to one another is correlated, and with reference to the knowledge of the road junction geometry by the roadside unit RSU, the roadside unit RSU is capable of computing a rough determination of which lane A . . . K is being used by which vehicle 1 . . . 10, so that this may be taken as a basis for traffic control.

In the scenario shown in figure portion 1b, the representation of the vehicles 1 . . . 10, positions of the vehicles 1 . . . 10, and the vehicle types and dimensions may be used to identify how the position information and the vehicle dimensions that are received by the roadside unit RSU and are sent by the vehicles 1 . . . 10 are represented.

This snapshot in time shows that the vehicle 1 is situated to the right in relation to the vehicle 2, and the vehicle 3 is situated to the left in relation to the vehicle 2. In a first approximation, it thus appears that the vehicle 1 is in lane C, vehicle 2 is in lane B and vehicle 3 is in lane A.

A similar consideration is also given to the vehicles 7, 8 and 9. Owing to the orientation of the vehicles, it is clear that vehicles 7 and 8 are approaching the junction, and the vehicle 9 is leaving the junction. Owing to the relative positioning, it is also shown that vehicle 7 is traveling on the right-hand side in relation to vehicle 8. Based on knowledge of the topology (e.g., geometry) of the junction, it is now evident in which lanes A . . . K the vehicles 1 . . . 10 are moving, even if the absolute positioning is not clear.

According to a development, the roadside unit RSU stores the received positions of each vehicle 1 . . . 10 and computes the lanes used for each further vehicle that approaches, waits, and also leaves the junction.

Figure 1C:
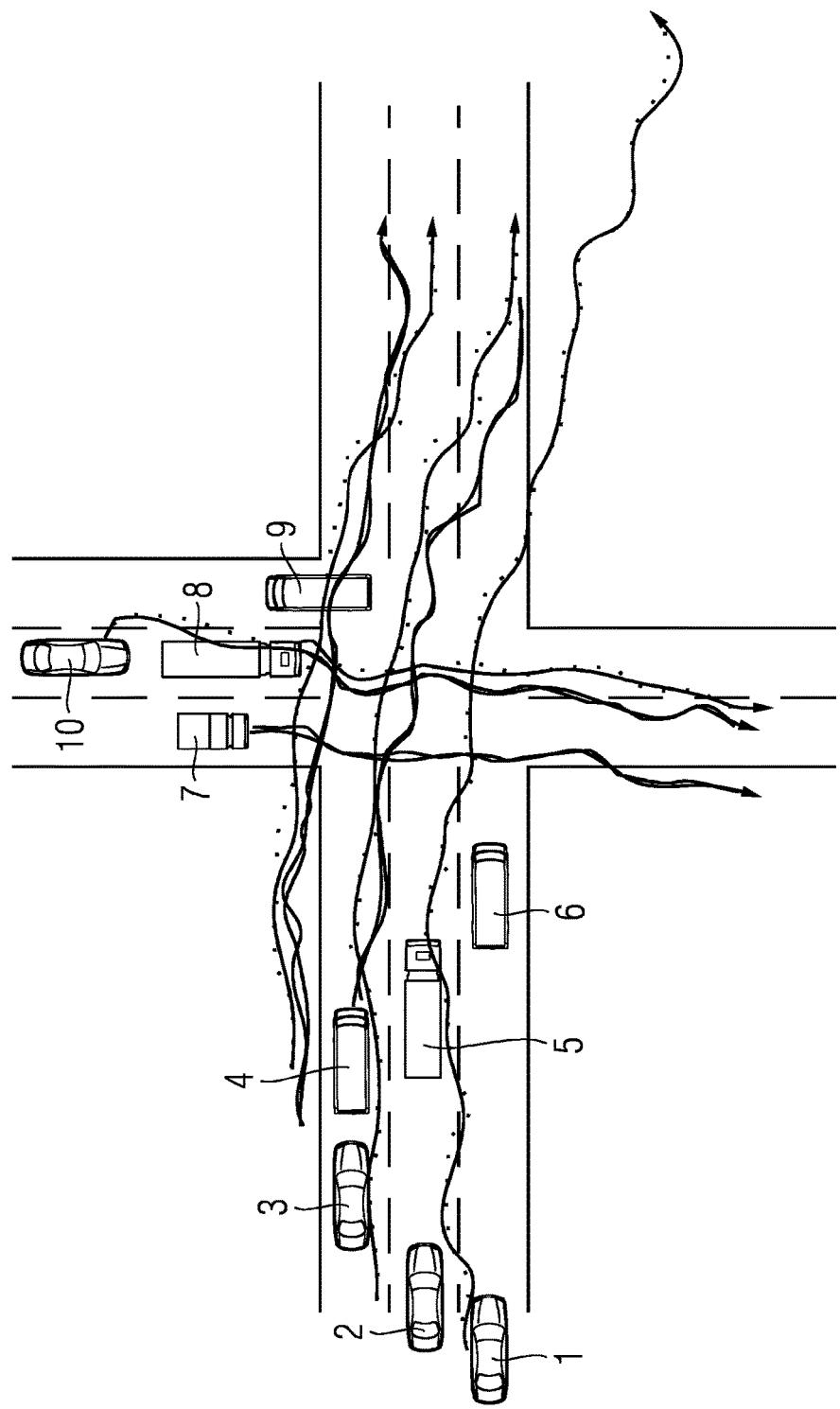

FIG. 1c shows an example of how such computed lane lines for each vehicle as have been ascertained and stored by the roadside unit RSU over a certain time and are shown as dotted lines. The roadside unit RSU overlaps all of these lines, so that a superimposed "overlap" image is produced, and computes the topology of the road junction therefore based on the vehicle movements (e.g., directions (see FIG. 1d)). This thus allows automatic adjustment of the topology, or the topology as distorted by atmospheric disturbances, and other errors in the satellite-assisted position finding.

Thus, the present embodiments make use of the fact that vehicles that are moving in the same lane produce a similar lane. These may be taken together and computed to produce a piece of lane information (e.g., lane line history). The more vehicles are considered over time, the better the computed lanes that result therefrom.

Figure 1D:
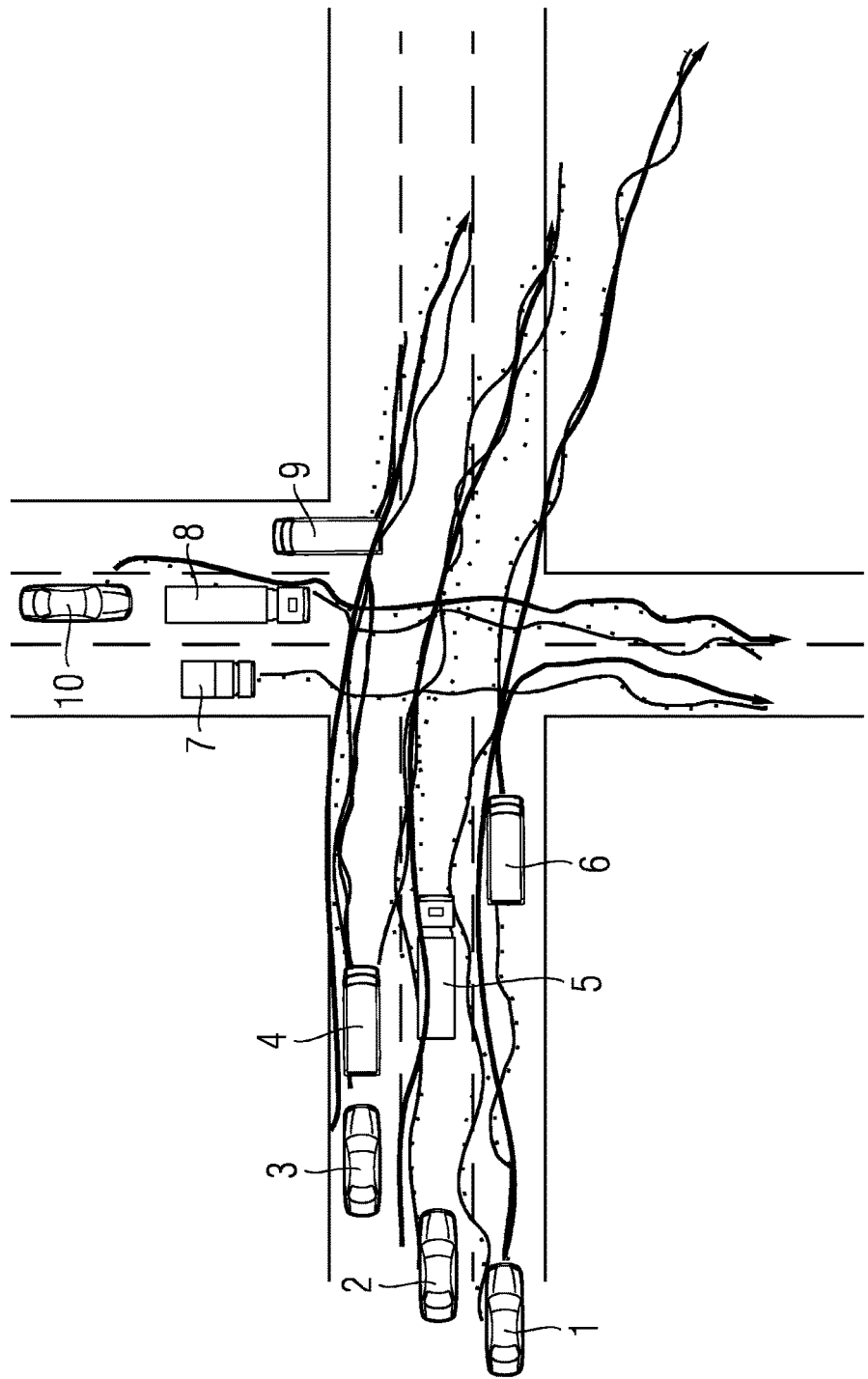

According to one or more of the present embodiments, the combination of all computed lanes then forms a computed topology that is logically aligned (e.g., mapped) with the topology stored in the roadside unit RSU, as shown in FIG. 1d. When a new vehicle approaches the road junction and transmits attributes of the vehicle (e.g., position, speed, orientation and dimension), the roadside unit RSU begins to compute the lane lines (e.g., trajectory lines) for this new vehicle.

In parallel therewith, this lane line of the new vehicle is compared with the existing computed topology for lane determination. This new lane line is then placed over the existing lane line map in order to allow refreshed computation of the topology (e.g., update). On account of atmospheric errors and the change of positions that are obtained through satellite position systems, computed lane lines vary with respect to time, which also needs to be taken into account by the roadside unit RSU. As a result of this, older lane geometries computed based on the lane lines are to be rejected.

One of the advantages of the present embodiments is therefore inexpensive determination of the position of vehicles in specific lanes within a traffic region, such as a junction, which use satellite position systems having low accuracy. This provides that local traffic inspection/control systems obtain detailed information (e.g., number of vehicles, speed, direction, which lane is being used) about the vehicles that are moving or waiting in the lanes.

Such control systems are then also capable of adjusting to the traffic situation (e.g., adjusting control thereto, such as the signal that is to be shown, the signal phase, the timing of the traffic light change, specifically for every single approaching road user).

This optimizes the flow of traffic and reduces waiting times (e.g., red light phases). There is therefore no longer a need for additional highly specialized sensors, and junctions or controllers therefore become much less expensive.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any proceeding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limited, and that it be understood that all equivalents and/or combinations of embodiments are intended to be included in this description.

The invention claimed is:

1. A method for communication based on a motor vehicle communication system interacting in an ad-hoc manner, wherein the communication takes place between road users and traffic infrastructure, the method comprising:

continuously sending, in the vicinity of a node of traffic routes, by a first radio transmission/radio reception device associated with a first road user, a message to at least one second radio transmission/radio reception device that is in a radio coverage area of the first radio transmission/radio reception device, the at least one second radio transmission/radio reception device being associated with a device of the traffic infrastructure, the continuously sending the message comprising continuously sending the message such that the received message is taken as a basis for ascertaining a first direction of a change of position of the first road user;

forming, by the device of the traffic infrastructure, a history about ascertained directions based on the messages;

ascertaining, by the device of the traffic infrastructure, a first correlation between the first direction and the history of directions;

ascertaining, by the device of the traffic infrastructure, a second correlation with a result of the first correlation and a reference lane from predetermined lanes at the node of traffic routes, the reference lane being taken as a basis for control of the first road user and corresponding to a geographical profile, particularly for initialization of traffic control; and controlling, by one or more signal transmitters, the first road user, the controlling comprising providing information to the first road user based on the first correlation, the second correlation, or the first correlation and the second correlation.

2. The method of claim 1, wherein forming the history comprises forming, when at least two road users are present, the history by the device of the traffic infrastructure at least based on a relative position of the at least two road users in relation to one another.

3. The method of claim 1, wherein forming the history comprises forming, when at least two road users are present, the history by the device of the traffic infrastructure based on a temporal trend in the position of the first road user within a time window.

4. The method of claim 3, wherein a length of the time window is stipulated.

5. The method of claim 1, wherein the road users are controlled such that information from signal transmitters is changed based on the first correlation.

6. The method of claim 1, wherein the message is at least intermittently sent at periodically repeated intervals in the vicinity of the device of the traffic infrastructure.

7. The method of claim 6, wherein a length of the period is stipulated.

8. The method of claim 1, wherein the message contains a piece of information conveying a direction of travel of the first road user, a position of the first road user, a dimension of the first road user, a type of the first road user, a speed of the first road user, or any combination thereof.

9. The method of claim 1, wherein the history is formed such that data received in time windows is used to ascertain lanes for vehicles by computer and to correlate the lanes, by forming a third correlation, such that the reference lane that is taken as a basis for controlling the road users and that corresponds to the geographical profile is reformed by a correlation maxima and stored.

10. The method of claim 1, further comprising updating the reference lane for stipulated events, the stipulated events comprising timer expiry, at least in the event of a discrepancy above a threshold value between a currently ascertained lane and the reference lane, or a combination thereof.

11. The method of claim 1, further comprising ascertaining a transmitted position based on a satellite-assisted navigation system.

12. The method of claim 1, wherein data transmission takes place based on a dedicated short-range radio communication standard.

13. The method of claim 1, wherein data transmission takes place based on the Wireless Access in Vehicular Environments (WAVE) standard IEEE1609 or derivatives thereof.

14. The method of claim 1, wherein data transmission takes place at least in part based on ETSI standard Intelligent Transportation Systems (ITS) or derivatives thereof.

15. The method of claim 1, wherein data transmission takes place at least in part based on IEEE standard 802.11 or derivatives thereof.

16. The method of claim 1, wherein a higher-priority first data transmission based on IEEE 802.11e, IEEE 802.11p, or ETSI IST Decentralized Congestion Control (DCC) is formed.

17. The method of claim 1, wherein a lower-priority second data transmission based on IEEE 802.11a/b/g or further derivatives thereof is formed.

18. The method of claim 1, wherein the communication with road users takes place at least in part based on a mobile radio standard.

19. The method of claim 1, wherein the communication with road users takes place at least in part based on European standard ETSI TC ITS, the American Vehicle Safety Communications Program (VSC), the successor thereto, "Connected Vehicle Communications Program," or the Japanese "Advanced Vehicle Safety Program, AVS".

20. The method of claim 1, wherein the communication with road users takes place at least in part based on ISO standard "continuous-air long and medium range" (CALM).

21. A static device of traffic infrastructure for communication in a motor vehicle communication system interacting in an adhoc manner, wherein the communication takes place between road users and traffic infrastructure, the static device comprising:

a computing device;

one or more signal transmitters; and a first radio transmission/radio reception device, the first radio transmission/radio reception device configured to continuously receive a messages from at least one second radio transmission/radio reception device associated with a first road user in the vicinity of a node of traffic routes, the static device being in a radio coverage area of the second radio transmission/radio reception device, wherein the received messages are taken as a basis for ascertaining a first direction of a change of position of the first road user, wherein the computing device is configured to:

form a history about ascertained directions based on the received messages;

ascertain a first correlation between the first direction and the history of directions; and ascertain a second correlation with the result of the first correlation and a reference lane from predetermined lanes at the node of traffic routes, the reference lane being taken as a basis for control of the road users and corresponding to the geographical profile, and wherein the signal transmitters control the road users, the control of the road users comprising provision of information to the road users based on the first correlation, the second correlation, or the first correlation and the second correlation.

22. The method of claim 1, wherein the signal transmitters comprise electronic signs, traffic lights, traffic management systems, or a combination thereof.

23. The static device of claim 21, wherein the signal transmitters comprise electronic signs, traffic lights, traffic management systems, or a combination thereof.

* * * * *